United States Patent [19]

Stube et al.

[11] 4,014,965

[45] Mar. 29, 1977

[54] PROCESS FOR SCRAPLESS FORMING OF PLASTIC ARTICLES

[75] Inventors: Steven H. Stube; Douglas S. Chisholm, both of Midland, Mich.

[73] Assignee: The Dow Chemical Company, Midland, Mich.

[22] Filed: Nov. 24, 1972

[21] Appl. No.: 309,249

[52] U.S. Cl. .................................. 264/23; 264/71; 264/92; 264/119; 264/126; 264/322; 264/325; 264/338

[51] Int. Cl.$^2$ ........................................ B06B 3/00

[58] Field of Search ............... 264/23, 71, 72, 109, 264/120, 126, 127, 322, 325, 332, 111, 119, 92, 338

[56] References Cited

UNITED STATES PATENTS

| | | | |
|---|---|---|---|
| 2,198,612 | 4/1940 | Hardy | 264/71 |
| 2,246,165 | 6/1941 | Dawihl | 264/23 X |
| 2,384,215 | 9/1945 | Toulmin | 264/23 X |
| 2,645,836 | 7/1953 | Sorensen | 264/23 X |
| 2,747,231 | 5/1956 | Reinhardt | 264/23 |
| 3,152,082 | 10/1964 | Davis | 264/127 X |
| 3,555,605 | 1/1971 | Angelotti | 264/71 |

OTHER PUBLICATIONS

SPE Journal, Jan. 1969, vol. 25, pp. 50–54, by P. M. Coffman.
Journal of Polymer Science, vol. XIII, pp. 565–582 by K. Deutsch et al., 1954.
Poly (1–Butene) –its preparation & properties, I. D. Rubin, Gordon & Breach, N.Y., 1968, pp. 61–67.
SPE Journal, May 1959, by L. T. Muus et al., pp. 368–372.
SPE Journal, Dec. 1968, vol. 24, by A. C. Werner et al., pp. 76–79.

Primary Examiner—Robert F. White
Assistant Examiner—Thomas P. Pavelko
Attorney, Agent, or Firm—M. S. Jenkins

[57] ABSTRACT

Plastic articles without foam spots are produced by an improved powder forming process wherein a powder of normally solid, thermoplastic polymer is compacted by means of vibratory energy into briquettes which are subsequently forged and formed into articles of fused polymer.

12 Claims, No Drawings

PROCESS FOR SCRAPLESS FORMING OF PLASTIC ARTICLES

BACKGROUND OF THE INVENTION

This invention relates to an essentially scrap free process for forming articles directly from powders of normally solid thermoplastic polymers.

Recently there has been discovered and described in application Ser. No. 215,632 filed Jan. 5, 1972, now abandoned, a new and useful process for forming articles directly from powdered thermoplastic resin materials. It has been found that plastic articles can be made in this manner at lesser expense than comparable articles made by either injection molding or conventional vacuum forming processes. The favorable economics of this newly described powder forming process are realized as a result of eliminating a pelletizing step, eliminating the formation of scrap, reducing the cooling cycle, and utilizing the polymer powder more efficiently.

In the practice of the aforementioned disclosed process, it is desirable, if not essential, to heat the briquettes prior to forging in order to cause at least partial sintering of the resin particles of the briquettes. This sintering is usually done in order to increase the cohesiveness or bond strength between the resin particles of the briquette so that it can be readily handled in preparation for forging and then forged satisfactorily. In addition, articles prepared by this technique often contain voids or areas of incomplete fusion in the molded plastic, hereinafter called "foam spots" unless special precautions are taken.

In order to achieve more favorable economics in the practice of the aforementioned powder forming process, it would be highly desirable to provide an improved process which substantially reduces the time of sintering the briquettes of the thermoplastic resinous polymer powder and which eliminates the formation of foam spots in the resultant articles.

SUMMARY OF THE INVENTION

In accordance with the present invention, there is provided an improvement in a process for forming articles from a powder of a thermoplastic resinous polymer. In the process, the powder in an amount sufficient to produce the desired article is compressed at a temperature below the melt temperature of the powder into a briquette having green strength. The briquette, after having been maintained at a temperature in the range from about the alpha transition temperature to less than the melting point or melt temperature of the polymer for a time sufficient to effect sintering, is forged into an article of fused polymer. The improvement which constitutes the present invention comprises compacting the powder with a vibratory energy, hereinafter called "vibratory compaction", to form the briquette. As a result of using vibratory compaction to form the briquette, sintering times required to give the briquette sufficient green strength are substantially reduced. More importantly, the briquette can be formed into a shaped article which is free of foam spots.

The improvement of the present invention has utility in the formation of articles as disclosed in the application Ser. No. 215,632. For example, the improvement of the invention may be utilized in the fabrication of articles of expanded polymer, in articles having a blended structure of 2 or more materials, or a multilayered structure or articles of oriented polymer. The articles may be of any shape such as tubular, conical, cut, sheet, and the like and of any size.

DETAILED DESCRIPTION OF THE EMBODIMENTS

Powders of thermoplastic resinous polymers are suitably employed in the practice of the present invention. By the term "thermoplastic resinous polymer" is meant any solid or semi-solid polymeric material which softens with application of heat. It is understood that both amorphous and crystalline polymers are suitable for the purposes of this invention. Preferably, the polymers are the synthetic resins. Exemplary preferred resinous polymers are the polymers of aliphatic $\alpha$-olefins, such as ethylene, propylene, butene-1, and isobutene; polymers of vinyl and vinylidene halides such as vinylidene chloride and vinyl chloride; polymers of monovinylidene carbocyclic aromatic monomers such as styrene, $\alpha$-methylstyrene, and chlorostyrene; polyamides such as the nylons; polyesters such as polyethylene terephthalate and the like. Especially preferred are those resinous polymers having a crystallinity (as measured by X-ray defraction methods) from about 30 to about 98 percent, including the crystalline polyolefins such as polyethylene and polypropylene, polyoxymethylene, isotactic polystyrene, and the normally crystalline vinylidene halide polymers. It is to be understood that suitable resinous polymers include copolymers of monomers such as those mentioned hereinbefore and blends of suitable polymers. In addition to non-foamable single polymer powders and powders of polymer blends, foamable polymer powder formulations containing blowing agents, polymer powder formulations containing other additives such as fillers, stabilizers, etc., and multilayered polymer powders are suitable materials for use in the improved powder forming process of the present invention.

Not all resin powders will work equally well in the practice of the present invention. Generally, those which have a small particle size, e.g., from about 10 to about 1000 microns, especially from about 15 to about 150 microns; a broad particle size distribution, low bulk density, and high ductility are preferred. It is found that powders that have a percent compaction (often called briquette compaction) of about 85 percent or higher are preferred. By percent compaction is meant the relationship of compaction of a sample of the powder to an equivalent amount of the polymer in the totally fused state which represents 100% compaction.

In the practice of the improved powder forming process of the present invention, the steps listed hereinafter are generally employed.

First, an amount of the powder sufficient to form the desired article is compacted in a die or other similar cavity using vibratory energy sufficient to provide a briquette having green strength. The compaction of the powder using vibratory energy is called "vibratory compaction". The vibratory energy is advantageously supplied by a generally oscillatory motion of an outside force acting on the means compressing powder or on the cavity holding the powder. For purposes of this invention, generally oscillatory motion includes oscillatory, vibratory, reciprocating, rotary and similar types of motion supplied in both cyclic and non-cyclic manner.

The conditions of vibratory compaction such as compaction pressure, temperature, vibration frequency, and time of compaction, etc., are suitably those sufficient to provide a briquette having green strength. Specific conditions can not be set forth which will be uniformly applicable to all polymers. For purposes of illustration, however, such conditions which are practical to employ in compacting polyethylene powder are as follows:

1. periods of vibration are within the range from about 0.008 to about 45 seconds, preferably from about 0.008 to 15 seconds;
2. compaction pressures are within the range from about 40 to about 60,000 psi, preferably from about 5,000 to about 25,000 psi;
3. vibration frequencies are within the range from about 1 to about 25,000 cycles per second, preferably from about 25 to about 15,000 cycles per second, and
4. temperatures are within the range from about ambient up to temperatures below the melting point of the polymer, preferably from about 20° to 120° C.

It is understood that any combination of time of compaction, vibration frequency, compaction pressure and temperature must be less than that which produces fusion of the thermoplastic resinous polymer powder. In addition, the foregoing conditions are interrelated such that, for example, an increase in pressure enables a corresponding decrease in frequency of vibration, and/or time of compaction.

For the purposes of this invention, "green strength" means the particles of the briquette have sufficient cohesion to hold together in a given configuration during normal transfer operations from the die or other similar cavity to forging apparatus or after the briquette is removed from the die or similar cavity and is cooled to room termperature.

Any means for supplying vibratory energy to a polymer powder contained in a die or similar cavity such that said powdery materials become reduced in bulk size is suitable for the purpose of this invention. Exemplary vibrating means include a reciprocating means such as a reciprocating pneumatic hammer which performs the vibration function and the compression function, a sonic means such as a hydroacoustic oscillator to perform the vibration function which can be employed in combination with a compacting means such as a press to perform the compression function, and other vibrating means such as oscillating means.

Following vibratory compaction, the briquette is heated to a temperature in the range from about the alpha temperature to a temperature less than the melting point or melt temperature of the powdered polymer for a period sufficient to sinter the briquette. For the purposes of this invention, "sintering" means the process by which a compacted assembly of particles is physically and/or chemically bonded across contacting particle interfaces or boundaries into a coherent body under the influence of elevated temperature, without substantial melting generally occurring.

"Alpha transition temperature" is the temperature at which the polymer becomes ductile. In amorphous polymers, the polymer becomes rubbery or leathery at this temperature and in crystalline polymers, the polymer at this temperature is sufficiently ductile to cold flow and fuse. Alpha transition temperature is further described in *Anelastic and Dielectric Effects in Polymeric Solids* by N. G. McCrum et al, J. Wiley and Sons, New York, 141–143 (1967). "Melting point" or "melt temperature" means the temperature at which the polymer reaches a melt or viscous fluid flow state and is normally melt-formed by fabrication such as injection molding. It is essential to obtain the benefits of this powder forming process that the polymer not be completely fused in this sintering step. By maintaining the temperature of the briquette below the melting point and melt temperature of the polymer, the particles of polymer are able to deform and fuse by a substantially plastic solid phase flow mechanism.

After the briquette is sintered, the surfaces of the briquette, the contacting surfaces of the forging apparatus in which the briquette is to be forged, or both are preferably lubricated. A suitable lubricant is any substance which can be applied to the aforesaid surfaces which will either reduce friction between the forging apparatus and powder or will deform easier than the powder, thereby serving as an interface layer between the briquette being formed and the forging apparatus during the forming, and which is compatible with the powder, i.e., non-crazing.

As lubricants, greases such as potassium oleate, silicone grease and oils and other substantially equivalent materials can be applied to the forging apparatus or the briquette, or both. Alternatively, solid particles such as polytetrafluoroethylene or zinc stearate can be sprayed onto the contacting surfaces of the forging apparatus of a polytetrafluoroethylene coat can be baked onto such contacting surfaces. Of the foregoing methods of lubrication, lubrication by using greases is preferred. The advantages of lubricating the forging apparatus and/or briquette during the forging operation are two-fold. The flow pattern of the fused material is changed so that less spring back (warpage) is obtained in the formed piece. Second, the pattern of the heat buildup in the material is changed to give a uniform temperature rise over the entire forged article or preform, rather than a concentrated temperature rise in a localized area.

The briquette is forged into the desired article or into a preform that can be subsequently shaped into the desired article. By "forging" is meant the fusing of the polymer particles of the briquette at a low temperature visco-elastic state wherein fusion is apparently accomplished by extensive lateral shearing of the polymer particles. The temperature of the briquette during forging remains below the melt temperature of the polymer. The resulting forged article or preform has the same density and the same or improved mechanical properties as it would have if made by a conventional melt forming process. In order to achieve fusion most efficiently, the contacting surfaces (platens) of the forging apparatus are preferably maintained at a temperature which is the same as the briquette, i.e., at a temperature between the alpha transition temperature and the melt temperature or melting point of the polymer. In the case wherein a preform is made, the resulting preform can then be cooled for later thermoforming or can be directly transferred by a clamp ring to a thermoforming mold, while still warm, for forming into a desired shaped article by conventional means. Exemplary conventional thermoforming means include differential air pressure means, matched die-forming, vacuum forming, plug assist-vacuum forming, drawforming, impact forming, rubber pad forming, hydroforming and the like.

It is understood that the briquette may possess the necessary heat energy at the time forging begins or may be brought to the desired temperature during the forging operation.

The following examples are given for purposes of illustrating the invention and should not be construed as limiting its scope. In the following examples, all parts and percentages are by weight unless otherwise indicated.

EXAMPLE 1

A polyethylene having a melt index of 0.3 decigrams/minute [ASTM D-1238-65T(E)] and density of 0.96 g/cc is formed in the following manner. A 7.5 g portion of polyethylene powder having an average particle size of 20–25 microns and a bulk density of ~15 lbs/ft$^3$ is placed in a cavity mold having a diameter of ~1½ inches and subjected to vibratory compaction with a reciprocating punch driven by an electrohydraulic servoram. The conditions of vibratory compaction are as follows: pressure of 6200 psi; frequency of 75 cycles/second, compaction time of 7 seconds, and ambient temperature.

The punch reciprocates within a distance (amplitude) of 0.030 inch during vibratory compaction.

The resulting briquette having green strength and dimensions of 1½ inches diameter and 0.3 inch thickness is removed from the cavity and sintered in an infrared oven operating at 5.5 amp. Dwell time in the oven is 15 minutes. The temperature at the surface of the briquette is 285° F, and at the center of the briquette, it is 262° F.

The sintered briquette is removed from the oven and placed between two platens (lubricated with silicone oil) of a forging apparatus. The upper platen has a temperature of 305° F and the lower platen has a temperature of 308° F. The briquette is then squeezed (forged) into a preform (4⅛ inches diameter × 0.03–0.045 inch thickness) using a force of about 35,000 lbs. whereby fusion of the particles of the sintered briquette occurs. Dwell time for forging is one second. The preform is thermoformed using conventional vacuum forming apparatus operating under the following conditions: vacuum of 29.2 inches Hg, pressure of 120 psig, plug temperature of 258° F and dwell time of 2 seconds. The resulting article is a bowl having a maximum diameter of 4⅛ inches and a depth of 1¾ inches and no foam spots.

For the purposes of comparison, a similar sample of the polyethylene powder is formed into an article following the procedure of Example 1 except that the polyethylene powder is compressed by a single non-vibratory compression instead of vibratory compaction. Compression pressure is greater than 6200 psi. The bowl that is vacuum formed from the resulting preform made by sintering and forging as in Example 1 exhibits a substantial number of foam spots.

EXAMPLE 2

Several additional runs are made using the general procedure of Example 1 except that different conditions of vibratory compaction are used as follows: pressures from 40 psi to 60,000 psi; frequencies from 5 to 25,000 cycles/second; compaction times from 0.5 to 45 seconds; temperatures from ambient (20°–25° C) to 120° C. The resulting briquettes are sintered in times less than 30 minutes and are formed into articles having no foam spots.

Forging and forming techniques and conditions as disclosed in application Ser. No. 215,632 filed Jan. 5, 1972 are employed in combination with the foregoing conditions of vibratory compaction with results equivalent to those obtained in Examples 1 and 2.

What is claimed is:

1. In a process for forming articles from a powder of a thermoplastic resinous polymer wherein the powder in an amount sufficient to produce the article is compressed at a temperature below the melt temperature of the powder into a briquette containing polymer particles and having green strength and the briquette having been maintained at a temperature in the range from about the alpha transition temperature to less than the melt temperature of the polymer for a time sufficient to effect sintering of the polymer particles of the briquette is forged into an article of fused polymer; the improvement which comprises compacting the powder with vibratory energy to form the briquette having a percent compaction of at least about 85 percent.

2. The improvement of claim 1 wherein the vibratory energy is supplied by a reciprocating means.

3. The improvement of claim 2 wherein the reciprocating means is a reciprocating pneumatic hammer.

4. The improvement of claim 1 wherein the vibratory energy is supplied by oscillating means.

5. The improvement of claim 1 wherein the vibratory energy is supplied by a combination sonic means and compacting means.

6. The improvement of claim 5 wherein the sonic means is a hydroacoustic oscillator and the compacting means is a press.

7. The improvement of claim 1 wherein a polyethylene powder is compacted with vibratory energy for a time in the range from about 0.008 to about 45 seconds, using a pressure in the range from about 40 to about 60,000 psi and a frequency in the range from about 1 to about 25,000 cycles per second.

8. The improvement of claim 7 wherein the polyethylene powder has an average particle size in the range from about 20 to about 100 microns.

9. In a process for forming articles from a powder of a thermoplastic resinous polymer wherein the powder in an amount sufficient to produce the article is compressed at a temperature below the melt temperature of the powder into a briquette containing polymer particles and having green strength and the briquette having been maintained at a temperature in the range from about the alpha transition temperature to less than the melt temperature of the polymer for a time sufficient to effect sintering of the polymer particles of the briquette is forged into an article of fused polymer; the improvement which comprises compacting the powder with vibratory energy for a time in the range from about 0.008 to about 45 seconds, using a compaction pressure in the range from about 40 to about 60,000 psi, a frequency in the range from about 1 to about 25,000 cycles per second and a temperature within the range from ambient up to temperatures below the melting point of the polymer to form the briquette.

10. The improvement of claim 7 wherein the time is in the range from about 0.008 to 15 seconds, the pressure is in the range from about 5,000 to about 25,000 psi, the frequency is in the range from about 25 to about 15,000 cycles per second and the temperature is in the range from about 20° to about 120° C.

11. The improvement of claim 1 wherein the polymer is a crystalline polymer and the alpha transition temperature is suitable to render the polymer sufficiently ductile to cold flow and fuse.

12. In a process for forming articles from a powder of a thermoplastic resinous polymer wherein the powder in an amount sufficient to produce the article is compressed at a temperature below the melt temperature of the powder into a briquette containing polymer particles and having green strength and the briquette having been maintained at a temperature in the range from about the alpha transition temperature to less than the melt temperature of the polymer for a time sufficient to effect sintering of the polymer particles of the briquette is forged with a forging apparatus into an article of fused polymer wherein lubrication is provided between the contacting surfaces of the briquette and the forging apparatus; the improvement which comprises compacting the powder with vibratory energy to form the briquette having a percent compaction of at least about 85 percent.

* * * * *